UNITED STATES PATENT OFFICE.

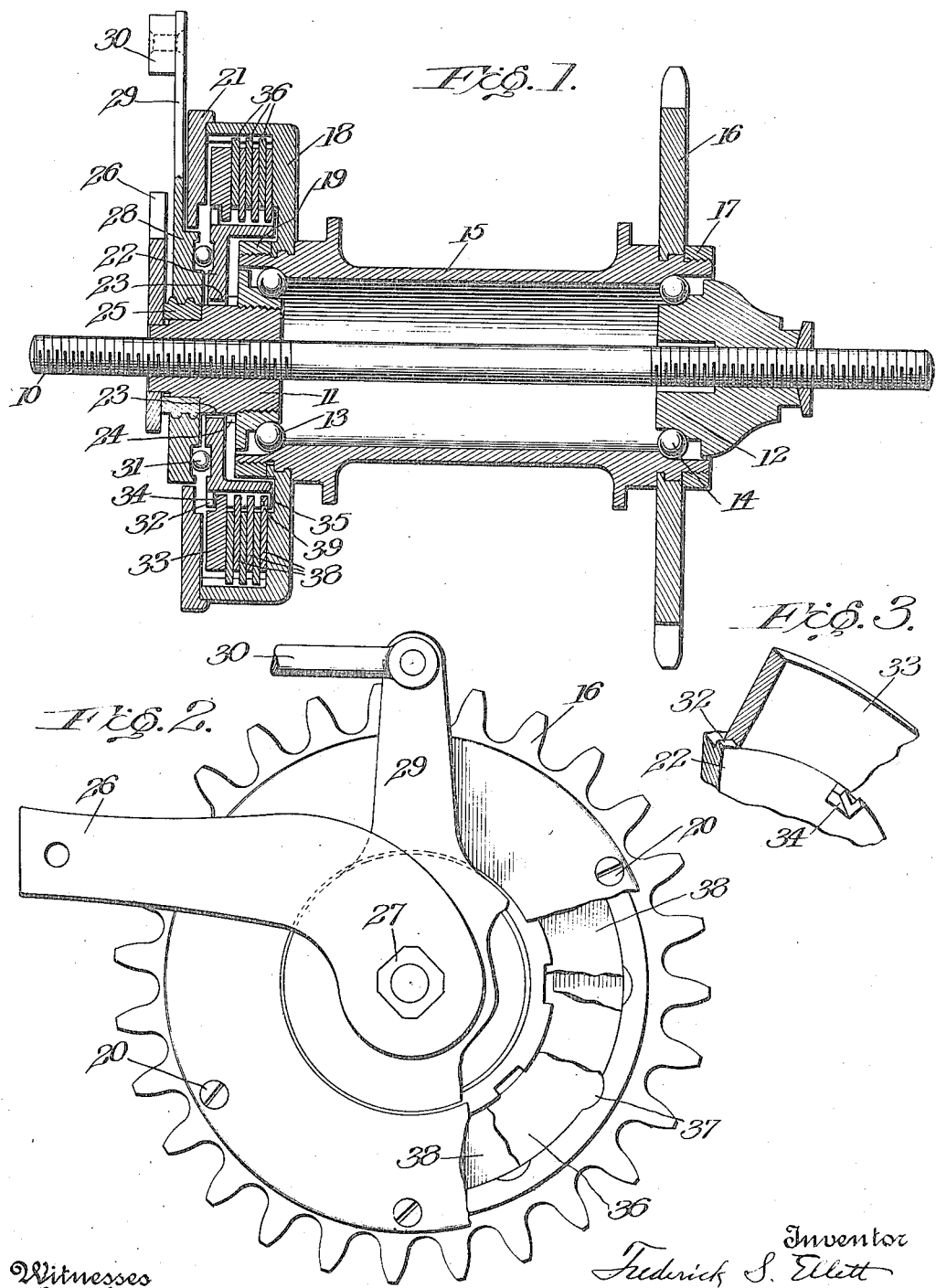

FREDERICK S. ELLETT, OF ELMIRA, NEW YORK.

BRAKE FOR MOTOR-CYCLES.

1,197,113.

Specification of Letters Patent.

Patented Sept. 5, 1916.

Application filed May 6, 1916. Serial No. 95,837.

*To all whom it may concern:*

Be it known that I, FREDERICK S. ELLETT, a citizen of the United States, residing at Elmira, Chemung county, State of New York, have invented certain new and useful Improvements in Brakes for Motor-Cycles, of which the following is a specification.

This invention relates to brakes for motor cycles and has for its objects the provision of a brake of the multiple disk type which is simple in construction and which may be readily and conveniently operated.

Other objects and the features of novelty will be apparent from the following description taken in connection with the accompanying drawings, in which, Figure 1 is a longitudinal section through a wheel hub embodying the invention; Fig. 2 is a view of the left hand end of Fig. 1 with certain parts broken away to more clearly show the interior construction of the brake; Fig. 3 is a perspective view of a detail.

Referring to the drawings, 10 indicates the usual stationary axial member having the screw-threaded end portions on which are arranged the threaded sleeves 11 and 12. The sleeves 11 and 12 are provided with ball races for the balls 13 and 14, on which is mounted the barrel 15 of the hub. A driving sprocket 16 may be secured to the barrel 15 in any suitable manner and may be held in position by a lock nut 17. On the end of the hub opposite the driving wheel 16 may be secured a casing 18, which casing may be held in position by a lock nut 19, the radial flange of the same constituting a disk. Secured to the outer side of the casing 19 by means of screws 20 is a plate 21 which coöperates with the casing to form an annular chamber.

Slidably arranged on the sleeeve 11 is a plate 22, this plate being preferably provided with inwardly extending lugs 23 which engage corresponding slots 24 in the surface of the sleeve. An externally threaded collar 25, the threads of which are of a comparatively coarse pitch, is secured on the sleeve 11, and an arm 26 is secured to the angular end portion 27 of the sleeve exteriorly of the collar 25 and has its outer end secured to any suitable part of the frame of the motor cycle. An internally threaded ring 28, having an operating arm 29, to which may be attached an operating rod 30, is arranged on the threaded collar 25 and is provided on its inner surface with a ball race for the balls 31 which are arranged between the ring 28 and the plate 22. By this arrangement the plate 22 will be moved inwardly by turning the ring 28. The plate 22 may be provided with an outwardly extending flange 32 which is engaged by a ring or disk 33, this ring having inwardly extending lugs 34 which engage suitable recesses or slots 35 on the outer surface of the plate 22.

Friction disks 36 having outwardly extending lugs or projections 37, which engage suitable recesses on the interior of the casing 18, are arranged within this casing, and disks 38, carried by the plate 22 and having inwardly extending lugs or projections 39 engaging the slots 34, are alternately arranged between the disks 36. By this arrangement of the friction disks 36 and 38 it will be observed that the disks 36, which are carried by the casing 18, will rotate with the barrel 15, and the disks 38, which are carried by the plate 22, will be held stationary. When the ring 28 is turned by the operating lever 30 to move the plate 22 inwardly, the friction disks will be clamped together in gripping engagement and retard the wheel, the retardation continuing so long as the ring 28 is held in the position to which it was turned. When the ring is turned backward from this position the pressure against the disks will be removed and the wheel will be permitted to run free.

Having thus described the invention, what is claimed and desired to be secured by Letters Patent is:

1. In a brake for motor cycles, the combination of a stationary axle, a wheel hub rotatably mounted thereon and having a driving wheel secured thereto, a plate secured to said wheel hub and having an axially extending flange forming a chamber, a removable plate secured to said flange and forming a closure for the outer side of said chamber, a plurality of friction disks carried by said flange and arranged in said chamber, an axially movable non-revoluble member carried by said stationary axle, a plurality of friction disks carried by said axially movable member and alternately arranged with respect to the first-mentioned disks, means carried by said member adapted to coöperate with said plate to hold said disks in gripping engagement, a non-revoluble cam member carried by said axle, a revoluble cam member engaging said non-revoluble cam member, a ball bearing between said revoluble cam member and said axially movable member, and means for operating said revoluble cam member to effect the gripping and ungripping of said friction disks.

2. In a brake for motor cycles, an axle, a wheel hub rotatably mounted thereon, an axially movable non-rotatable member, disks carried by said member and arranged radially outside of the hub, a plurality of disks one of which is fixed against axial movement alternating with the first-mentioned disks and connected to the hub, means carried by said member adapted to coöperate with said fixed disk to hold said disks in gripping engagement, a non-revoluble cam member carried by said axle, a revoluble cam member engaging said non-revoluble cam member and said axially movable member, and means for operating said revoluble cam member.

In testimony whereof I affix my signature.

FREDERICK S. ELLETT.